United States Patent Office 3,216,843
Patented Nov. 9, 1965

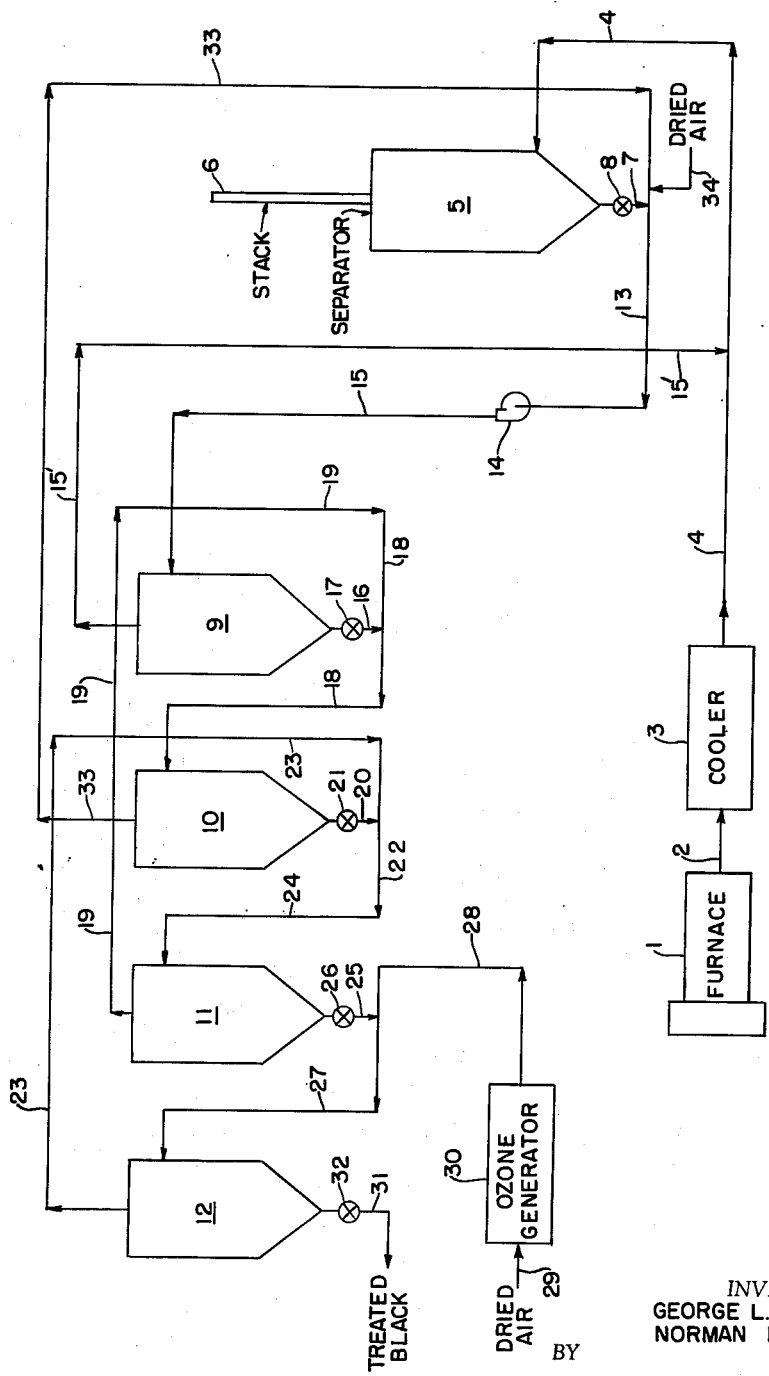

3,216,843
TREATMENT OF CARBON BLACK
George L. Heller, Monroe, and Norman N. McRee, West Monroe, La., assignors to Columbian Carbon Company, New York, N.Y., a corporation of Delaware
Filed Dec. 21, 1962, Ser. No. 246,432
6 Claims. (Cl. 106—307)

This invention relates to improvements in the process for modifying the characteristics of furnace carbon black, in accordance with the use for which it is intended, by treating the carbon black with ozone. More particularly, it provides an improved and highly effective method whereby the carbon black may be more uniformly and more economically treated with ozone and whereby certain selected characteristics may be imparted to the black without deleteriously affecting other desired characteristics, including its dispersing properties. The invention is especially useful in producing long-flow, high-color ink blacks by treating selected, powdery furnace blacks with ozone, but its utility is not restricted as to the use of the modified black.

It has heretofore been proposed to modify the pH and rubber compounding characteristics of furnace carbon blacks and simultaneously increase the hardness of pellets produced therefrom by subjecting either preformed pellets of the black, or else subjecting the black during the pelleting operation in a tumbling drum, to a current of air at a temperature 400°–1200° F. or a current of ozonized air. A recognized disadvantage of treating the carbon black in accordance with that proposal is that the resultant carbon black is inevitably obtained in hardened pelleted form. The hardened pellets resulting from such operation are unsuited for many purposes, not only because of difficulty in dispersing the carbon black after it has been formed into hardened pellets, but because of lack of uniformity of the treatment.

To avoid these recognized objections, it has been proposed to suspend the carbon black in fluffy, powder form in a hot gas stream containing 1 to 10% by volume of molecular oxygen and of a temperature of 600° to 1200° F. This proposal has likewise presented difficulties, including the tendency of the carbon particle to become pitted by partial combustion with the oxygen at such elevated temperatures.

In copending application Ser. No. 10,835 filed March 19, 1962, now abandoned, there are described and claimed long-flow, high-color furnace carbon blacks especially adapted for use as an ink pigment and a method for producing such blacks by intimately contacting a carefully selected furnace black with an ozone-containing air stream by suspending the black in said air stream. The present invention is especially useful in producing ink blacks by the general procedure of said copending application, though, as previously noted, its utility is not restricted thereto. Further, the present invention provides improvements in the process of said pending application whereby greater uniformity and flexibility of the treatment and more economical and effective use of the ozone are obtained.

Furnace carbon blacks, and especially such carbon blacks freshly separated by conventional methods from the furnace effluent gases, usually contain substantial amounts of absorbed or occluded gases and moisture. We have found that the effectiveness of ozone in modifying characteristics of the carbon black is materially reduced by the presence of such gases and moisture and that superior results and more economical utilization of the ozone may be accomplished by preliminarily eliminating or reducing the gas and moisture content of the black.

The ozonated dried air used in treating the carbon black is a major expense in such processes and it is highly desirable that it be used in the fullest advantage in the most effective manner. By eliminating or reducing the amount of absorbed and occluded gases, the consuming of the ozone by wasteful side reactions is minimized.

Highly desirable advantages are obtained, in accordance with our present invention, through preconditioning the carbon black by subjecting it to a preliminary treatment for minimizing the gas and moisture content. This is accomplished by resuspending the previously separated and collected carbon black in dry air to form an aerosol, whereby moisture and occluded gases are absorbed by the dry air, and separating the carbon black from the gaseous suspension as a preliminary step in the ozonation process.

Advantageously, the dry air used for forming the aerosol in this preliminary step is that which has been separated from the carbon black following the ozone treatment, since it is still relatively dry. This dry air may contain some unreacted ozone which is capable of reacting to some extend with the fresh black suspended therein, but has approached equilibrium with the black separated therefrom. By this procedure, marked economy is effected in the further utilization of costly dried air, which would ordinarily be vented into the atmosphere, and further avoids loss of residual ozone.

In accordance with the preferred aspect of the invention, the carbon black which has been resuspended in dry air, containing a greater or less proportion of ozone, or no ozone at all, and then separated therefrom, is subjected to a series of resuspensions and separation steps in which the gaseous medium is ozone-containing dried air of progressively higher ozone concentrations. By this procedure, a more effective and complete utilization of the ozone is obtained, since the fresh and more reactive carbon black is first treated with the gas of lowest ozone concentration and the partially ozonated carbon black is then further treated with ozonated dried air of higher ozone concentration, thus preventing the establishment of equilibrium conditions which result in loss of, or in effectual use of, the ozone.

Further, by this countercurrent flow pattern, the extent and nature of the modification of the carbon black can be more actively controlled and a superior, more uniform product obtained. Also, by this method, full utilization of the dried air for removing moisture and occluded gases from the carbon black is more fully realized. In addition to these many advantages, the required treating time for obtaining the desired modification of the black is usually markedly reduced.

The product of the ozonation reaction may be represented by the conventional formula $C_xO_y$ and it will be recognized that as the production of this reaction product progresses, the ozone content of the aerosal will normally decrease. This increase in $C_xO_y$ and decrease in ozone content tend to decrease the reaction rate until finally a state of equilibrium is approached. In accordance with our preferred method, this trend is periodically interrupted by our successive reformations of aerosols in gaseous media containing progressively increased concentrations of ozone.

The ozonation step of our process is carried out at moderate temperatures, preferably not exceeding about 120° F., though somewhat higher temperatures, not exceeding about 300° F., may be used without deleteriously affecting the product. At temperatures in excess of about 300° F., there is a tendency to pit the surfaces of the carbon black particles. The process has been successfully operated at temperatures even below normal atmospheric temperatures.

Optimum time of contact between the carbon black and the respective gaseous constituents of the aerosols is subject to considerable variation. In the preliminary step, the contact time should be sufficient to permit a substantial reduction in absorbed or occluded gases and moisture by absorption in the dry air stream, and in the ozonation step or steps the optimum contact time will depend primarily upon the desired modification of the carbon black characteristics and other operating conditions including temperature, particle size and degree of dispersion. Accordingly, specific limitations as to contact time cannot be expressed numerically, but optimum contact time for effecting the desired modification of a particular carbon black may be readily determined by simple tests. Generally, the entire treatment will require less than one minute, usually only a few seconds, and the short treating period greatly reduces deleterious effects on the carbon black particles which might result from excessive and prolonged agitation, for instance dense aggregate formation or pelletizing.

The concentration of ozone in the dried air used for forming the aerosols in the ozonation steps is likewise subject to considerable variation, generally, an ozone concentration of about 1% to about 3%, by weight, is preferred. Usually, no noticeable advantage is obtained by using ozone concentrations exceeding about 3% by weight and the ozonation reaction has been found to proceed uniformly and rapidly even when the concentration of ozone in the dried air is less than 1% by weight, for instance about ½%. These treating gases may be produced by passing carefully dried air through an ozonizer of the electrical discharge type, well-known in the art.

The amount of carbon black suspended in the respective gas streams to form the aerosols is not critical, so long as the aerosols can be properly maintained and treatment effected to the desired extent. This will depend somewhat upon the apparent bulk density of the carbon black and the degree of turbulence maintained. We have usually found that aerosols containing about 50 to about 250 grains of carbon black per cubic foot of gas gives satisfactory results. Even higher or lower loadings are possible depending upon the conditions just mentioned.

The velocity of the aerosols through the treating system should be sufficiently high to maintain the carbon black in a thoroughly suspended state, but excessively high velocities tend to create excessive turbulence which tends to result in the formation of aggregates of the carbon lack particles. Velocities as low as 5 feet per second may be employed with the finer flocculent carbon blacks and velocities of 40 to 50 feet per second have been used to advantage in producing ink blacks from rubber grade blacks, in accordance with the general procedure described and claimed in the aforesaid pending application Ser. No. 180,835.

Though the present invention has been effectively employed in treating somewhat aged and loosely packed fluffy carbon black, it is most effective in treating unpacked carbon blacks which have just previously been separated from the furnace effluent gases in which they are formed, thus avoiding mechanical action and storage aging and assuring the presence of a fresh, highly-active particle surface. No intermediate cooling of the freshly produced and collected carbon black is ordinarily required unless the temperature of the aerosol produced therefrom would exceed about 300° F.

The invention will be further described and illustrated with reference to the accompanying drawing which represents, diagrammatically, apparatus which may be used with advantage in carrying out the process in accordance with the preferred embodiment of our invention. It will be understood, however, that the invention is not restricted to the particular process steps and conditions illustrated nor as to apparatus in which the process is carried out.

The accompanying drawing represents a flow diagram of an installation adapted to the carrying out of that aspect of our invention in which a freshly produced and collected furnace black is preconditioned, as previously described, and thereafter subjected to successive resuspensions to form aerosols of progressively higher ozone concentrations.

The furnace in which the carbon black is produced is diagrammatically represented at 1 and the effluent furnace gases, carrying the carbon black in suspension, pass from the furnace through conduit 2 to and through the cooler 3 and thence through conduit 4 to a separation and collection system diagrammatically represented at 5. Though this separation system is shown in the drawing as a single unit, it will be understood that it may comprise a series of separators, for instance a series of cyclone separators which may, if desired, be preceded by an electrostatic precipitator, in accordance with conventional practice. However, for simplicity, we shall describe the separator as a single unit of the cyclone type.

In the separator, the carbon black is separated from the precooled suspension in the furnace gases and the latter pass off into the atmosphere through a stack represented at 6. The separated carbon black collects in the lower portions of the separator and is withdrawn therefrom through outlet 7, which will normally be equipped with a seal-type or gas-lock valve, indicated at 8, adapted to inhibit the escape of gases through conduit 7.

The apparatus so far described is conventional and the producing of the furnace carbon black and the separation of the black from the furnace gases constitute no part of the present invention and need not here be described in greater detail.

The apparatus for treating the carbon black in accordance with the present invention comprises four treating chambers 9, 10, 11 and 12, respectively. These chambers may, with advantage, be designed similar to conventional cyclone separators and each is adapted to the maintaining of the carbon black in suspension in the form of an aerosol for a brief period of time followed by the separation of the carbon black from the aerosol, as well understood by the art. The carbon black from separator 5 courses through the treating chambers in the order named and is carried from the separator 5 to treating chamber 9 through conduit 13, blower 14 and conduit 15 in suspension in a gas stream consisting essentially of dry air from a source presently to be described.

Upon entering treating chamber 9, the suspension is maintained for a brief period in the form of an aerosol and the carbon black finally separated from the aerosol by action characteristic of separators of the cyclone type. While in aerosol form, occluded and absorbed gases and moisture are absorbed from the carbon black by the dried air constitutent of the aerosol, and are carried off from treating chamber 9 by the dried air stream through conduit 15' and are conveyed therethrough to conduit 4 through which they are conveyed together with the suspension from the cooler to separator 5 and eventually passed into the atmosphere through stack 6. Any carbon black carried off by these gases from chamber 9 is recovered by separator 5.

The carbon black separated in treating chamber 9 passes therefrom through outlet 16, controlled by gas-lock valve 17, and falls into conduit 18 where it is picked up in suspension in a stream of gases passing from treating chamber 11 through conduit 19 and is carried thereby into treating chamber 10. In chamber 10, the areosol is maintained for a brief period and the carbon black then separated therefrom and passes from separator 10 through outlet conduit 20, controlled by gas-lock valve 21, and dropped into conduit 22 where it is picked up and resuspended in a gas stream passing from treating chamber 12 through conduit 23 and carried through conduit 24 into treating chamber 11.

After a brief period in treating chamber 11 in aerosol form, the carbon black is separated from the gaseous constituent and passes from the chamber through outlet conduit 25 controlled by gas-lock valve 26 and dropped into conduit 27 where it is picked up by a stream of fresh ozonated dried air supplied through conduit 28 from dried air inlet 29 and ozone generator 30 and is carried by the ozonated dried air into treating chamber 12. After being maintained in areosol form for a brief period in chamber 12, the carbon black is separated from the gaseous constituent and passes from the chamber through conduit 31, controlled by gas-lock valve 32, to packaging, storage, pelleting or other treatment or use.

By the arrangement just described, the freshly collected carbon black from separator 5 is preconditioned by being resuspended in the dried air passing from treating chamber 10 through line 33 which may, but does not necessarily, contain residual ozone. The carbon separated in treating chamber 9 is resuspended in ozone-containing dried air from treating chamber 11 and the carbon black from treating chamber 10 is resuspended in ozonated dried air from treating chamber 12 while the carbon black separated in treating chamber 11 is resuspended in a stream of fresh ozonated dried air and carried thereby into the final treating chamber 12. Thus the partially treated carbon black is successively subjected to progressively higher concentrations of ozone while the occluded or absorbed gases and moisture present in the carbon black is being constantly reduced.

It will be understood that the invention is not restricted to the particular number of steps of resuspension and separation shown in the drawing. An even greater number of steps may be employed with advantage, the controlling factor being equipment costs. Similarly, marked advantages are obtained by our present process where an even lesser number of resuspension-separation steps is employed. For instance, the treating chamber 10 may be eliminated, the carbon black from preliminary treater 9 being passed direct to treating chamber 11, and the carbon black being conveyed to treating chamber 9 by the gas stream from treating chamber 11.

Similarly, the treating chamber 11 may also be eliminated with appropriate connections for conveying the preliminary treated carbon black directly to the treating chamber 12 in suspension in the gas stream from chamber 12, or the carbon black from separator 5 may be conveyed to the preliminary treating chamber 9 in suspension in the gas stream from the treating chamber 12.

However, in accordance with the preferred aspect of the invention, at least two stages of ozonation treatment and separation should be used. Where desired, supplemental dried air may be introduced into the system through conduit 34 for conveying the carbon black from separator 5 to the preliminary treating chamber 9. As previously noted, the dried air stream used for forming the aerosol in the preliminary treating chamber 9 need contain no ozone, but the presence of ozone in said air stream does not deleteriously affect the process or its economy, provided residual ozone does not escape from the system with the stack gases.

In each of the steps described, the elutriating gas stream is quite dry, i.e., far below the atmospheric temperature dew point for water. Further, each successive stream of the elutriating gas is somewhat drier than that used for forming the aerosol in the preceding step. Likewise, each successive stream of elutriating gas contains a progressively smaller proportion of the gases initially absorbed or occluded in the carbon black. Consequently, by the procedure described, a most effective reduction of absorbed moisture and gases from the carbon black is obtained.

Of even greater importance, the furnace black resulting from the treatment retains its fluffy, powdery condition and is readily dispersible, for instance, in ink vehicle. Appropriate tests indicate that the aggregate content and bulk density of the carbon black is not increased by our ozonation treatment.

We claim:

1. In the process for treating a furnace carbon black with ozone to modify the characteristics of the carbon black by suspending it in an ozone-containing gas, the improvement comprising the following steps in sequence:

(a) resuspending a furnace carbon black, which has previously been separated and collected in powder form from the effluent furnace gases in which it was produced, to form an aerosol in a gas consisting essentially of dried air to substantially reduce the moisture and occluded gas content of the carbon black;

(b) separating the carbon black from the air and desorbed moisture and occluded gases;

(c) resuspending the carbon black from step (b) to form an aerosol in ozone-containing dried air at a temperature not exceeding 300° F. to effect reaction of the ozone with the carbon black; and (d) separating the treated carbon black from the aerosol of step (c).

2. The process of claim 1 in which the resuspension step (a) immediately follows the separation and collection of the carbon black from the effluent furnace gases.

3. The process of claim 1 in which the temperature of the aerosol formed by step (c) does not exceed 120° F.

4. The process of claim 1 in which the carbon black from step (d) is again suspended to form an aerosol in ozone-containing dried air at a temperature not exceeding 300° F. and of which the ozone concentration is in excess of that of step (c) and the carbon black is separated from the aerosol.

5. The process of claim 4 in which the gas from which the carbon black is finally separated is used in forming the aerosol of step (a).

6. The process of claim 4 in which the resuspension and separation steps are repeated in sequence, the gaseous constituent of the aerosol of successive steps being dried air containing progressively increasing proportions of ozone.

References Cited by the Examiner

UNITED STATES PATENTS

| | | | |
|---|---|---|---|
| 2,682,448 | 6/54 | Cines | 23—209.1 |
| 2,771,158 | 11/56 | Bray et al. | 23—209.9 X |
| 2,984,547 | 5/61 | Antonsen | 23—209.1 |

MAURICE A. BRINDISI, *Primary Examiner.*

UNITED STATES PATENT OFFICE
CERTIFICATE OF CORRECTION

Patent No. 3,216,843

November 9, 1965

George L. Heller et al.

It is hereby certified that error appears in the above numbered patent requiring correction and that the said Letters Patent should read as corrected below.

Column 1, line 45, for "Ser. No. 10,835" read -- Ser. No. 180,835 --; column 3, line 45, for "carbon lack" read -- carbon black --.

Signed and sealed this 9th day of August 1966.

(SEAL)
Attest:

ERNEST W. SWIDER
Attesting Officer

EDWARD J. BRENNER
Commissioner of Patents